Oct. 11, 1960   E. D. PHILLIPS   2,955,390
LENS GRINDING MACHINE OR GENERATOR
Filed July 20, 1956   4 Sheets-Sheet 1

Inventor
Edwin D. Phillips
By Shoemaker & Mattare
ATTYS

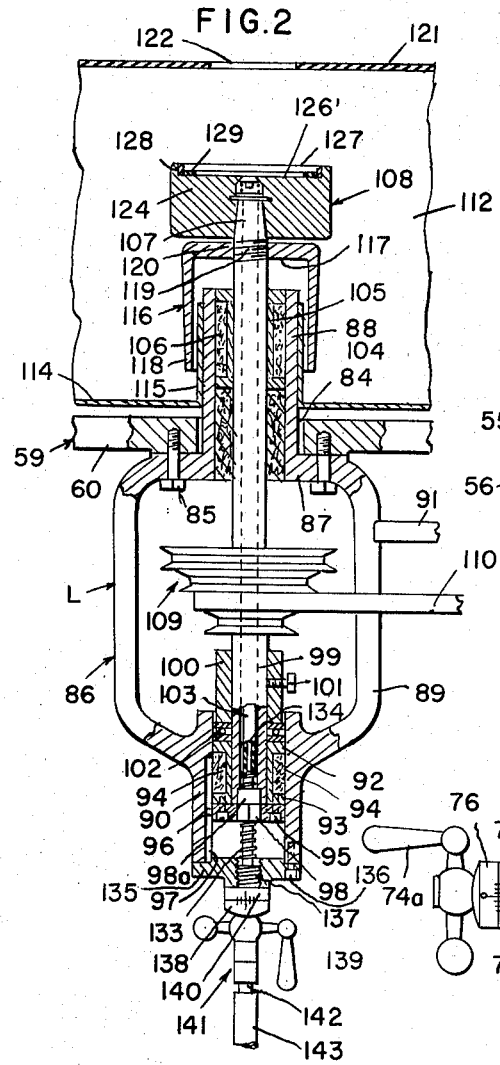
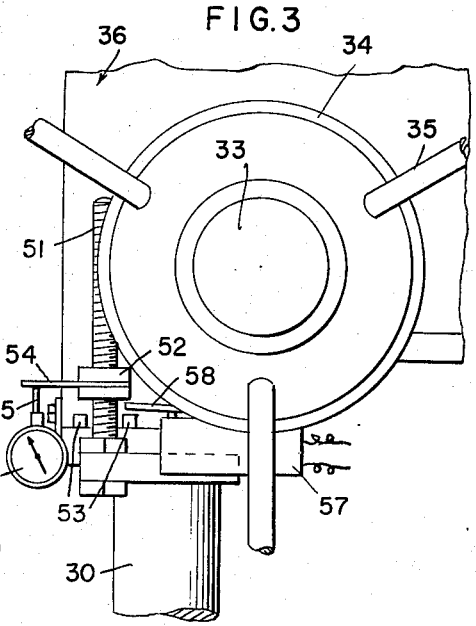
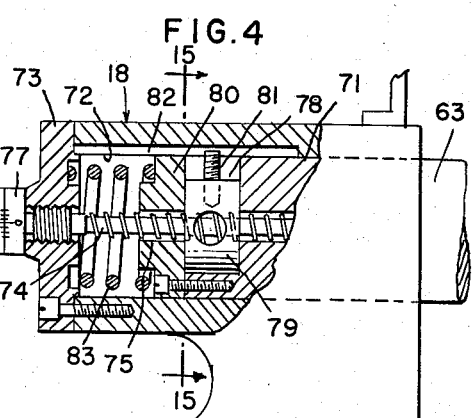
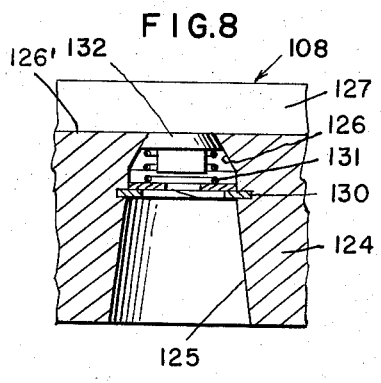
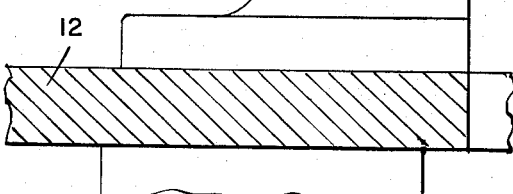
Inventor
Edwin D. Phillips

Oct. 11, 1960 E. D. PHILLIPS 2,955,390
LENS GRINDING MACHINE OR GENERATOR
Filed July 20, 1956 4 Sheets-Sheet 3
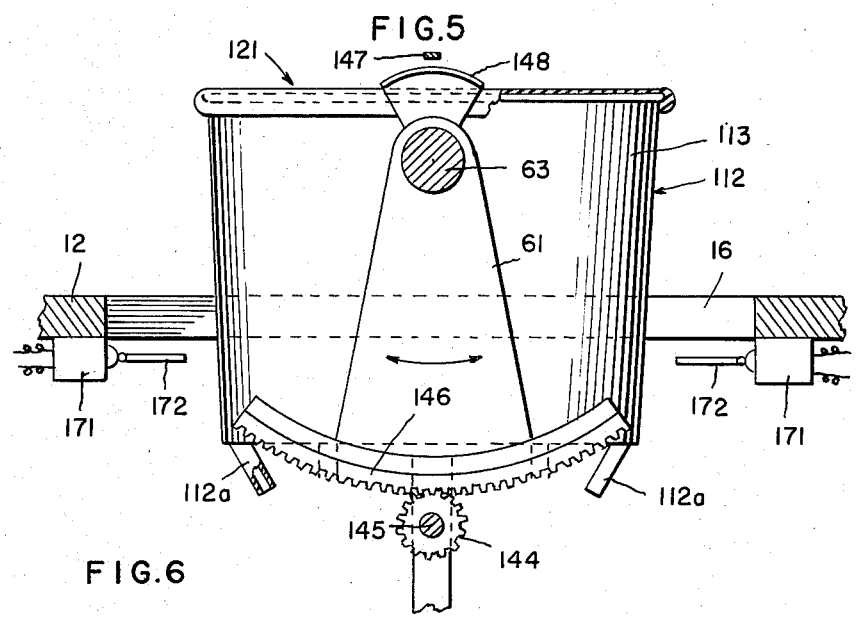
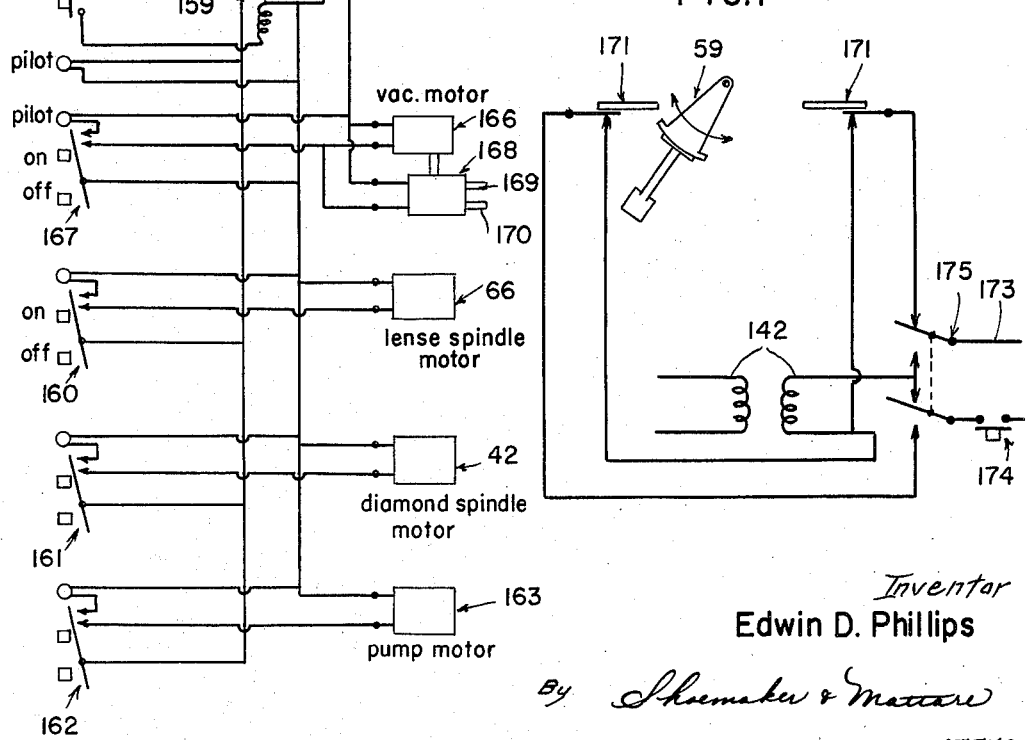
Inventor
Edwin D. Phillips
By Shoemaker & Mattare
ATTYS

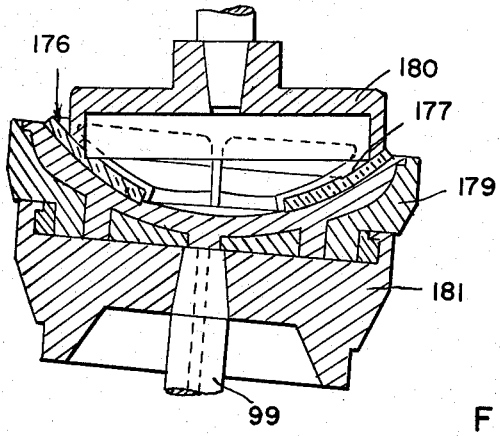
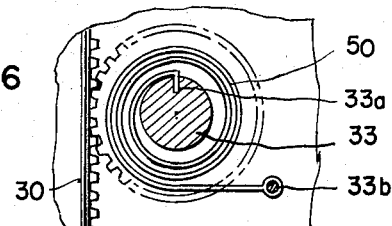
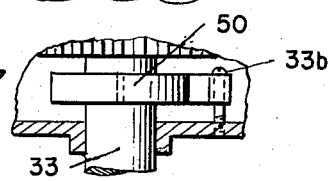
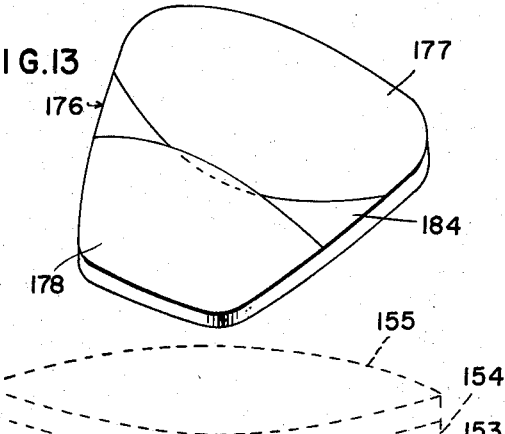
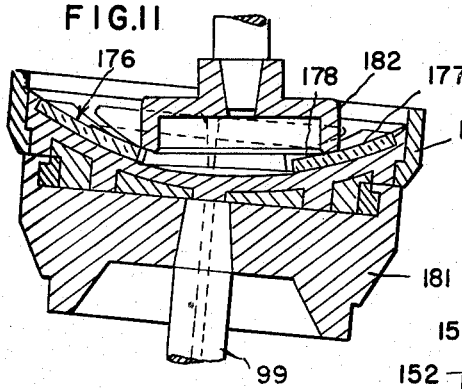
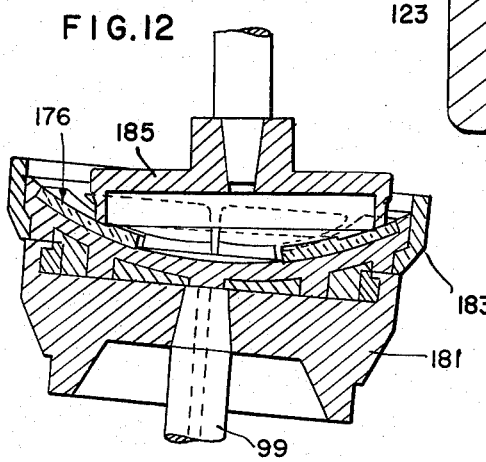

United States Patent Office 2,955,390
Patented Oct. 11, 1960

2,955,390

LENS GRINDING MACHINE OR GENERATOR

Edwin D. Philips, P.O. Box 188, Middlesex, N.J.

Filed July 20, 1956, Ser. No. 599,114

22 Claims. (Cl. 51—124)

This invention relates broadly to improvements in machines for grinding lenses of all types, that is, lenses either of the convex, concave or plano form or compound lenses in which two or more surfaces have different radii.

An object of the present invention is to provide a new and novel lens grinding machine by means of which the generation of a wide range of curves for optical lenses of any type or diameter may be effected.

Another object of the invention is to provide a machine of the above described character wherein the range of optical lenses of different curves or of flat character may be generated without modification of the machine construction.

Still another object of the invention is to provide a new and novel optical lens grinding machine by means of which compound lenses may be ground or generated such, for example, as the type of lens illustrated and claimed in Patent No. 2,743,649, of William Phillips, issued May 1, 1956.

Another object of the invention is to provide a new optical lens grinding machine which is designed to grind a lens to a predetermined or preset thickness and then automatically cease functioning.

A still further object of the invention is to provide an optical lens grinding machine which is designed in a novel manner whereby the curve being generated may be changed while the machine is in operation.

More particularly, the invention has for an object to provide an optical lens grinding machine wherein a diamond spindle and lens supporting spindle are supported to be brought into coaxial alignment with means whereby the diamond spindle may be swung across the axis of the lens spindle as well as being movable axially relative to the lens spindle and wherein the lens spindle is supported for back and forth movement across the axis of the diamond spindle and for angular traverse with respect to the diamond spindle.

It is also an object of the present invention to provide a new and novel means for maintaining a lens supporting chuck upon the rotary lens spindle by vacuum means applied to the chuck through the supporting spindle.

It is also another object to provide novel manually operable micrometer adjusting means for axially moving the lens spindle and for effecting back and forth movement of the lens spindle together with the grinding pan and novel motor drive means for effecting the angular traverse of the lens spindle together with a safety shut-off for the angular traverse to prevent the latter swinging or traversing beyond a desired position.

The invention will be best understood from a consideration of the following detailed description taken in connection with the accompanying drawings, with the understanding that the invention is not confined to a strict conformity with the showing of the drawings, but that minor changes may be made therein so long as such changes mark no material departure from the salient features of the invention as defined by the claims.

In the drawings:

Figure 2 is a view partly in section and partly in elevation, on an enlarged scale, of the diamond spindle and supporting means therefor with adjacent parts of the machine broken away, the spindle being shown supporting a suction or vacuum retained chuck.

Figure 3 is a view in side elevation on an enlarged scale of the diamond spindle operating means together with the microswitch and depth stop by which the operation of the machine is stopped when the desired grinding depth has been reached.

Figure 4 is a detail view on an enlarged scale partly in elevation and partly in section of the micrometer adjustment for effecting the horizontal or front-to-rear shifting of the lens spindle and grinding pan.

Figure 5 is a sectional view taken substantially on the line 5—5 of Figure 1 and showing on an enlarged scale the supporting cradle for the grinding pan and the angular traverse limiting switches associated therewith.

Figure 6 shows the electric circuit diagram for the major portion of the machine, while Figure 7 shows the electric circuit diagram for the angular traverse switches and manual means for controlling the angular traverse motor.

Figure 8 is a detail section of the middle portion of the vacuum chuck showing the construction thereof.

Figure 9 illustrates a magnetic chuck for maintaining a lens adapter in position for the grinding of a lens.

Figures 10, 11 and 12 illustrate the manner in which diamond grinding tools of different diameters may be employed in the machine of the present invention for the simultaneous grinding of a number of compound optical lenses of the form illustrated in the William Phillips patent hereinbefore referred to.

Figure 13 is a view in perspective of a one-piece multifocal monocentric ophthalmic lens such as is disclosed in the issued patent above referred to, which can be generated by the use of the present machine.

Figure 16 is a detail section taken across the operating shaft for feeding the grinder spindle and showing the spring means which is maintained under tension for effecting automatic advancement of the grinder spindle toward a lens being generated.

Figure 17 is a fragmentary detail showing in top plan a portion of the shaft of Figure 16 and showing the top plan of the control spring.

Figures 1, 14, 15:
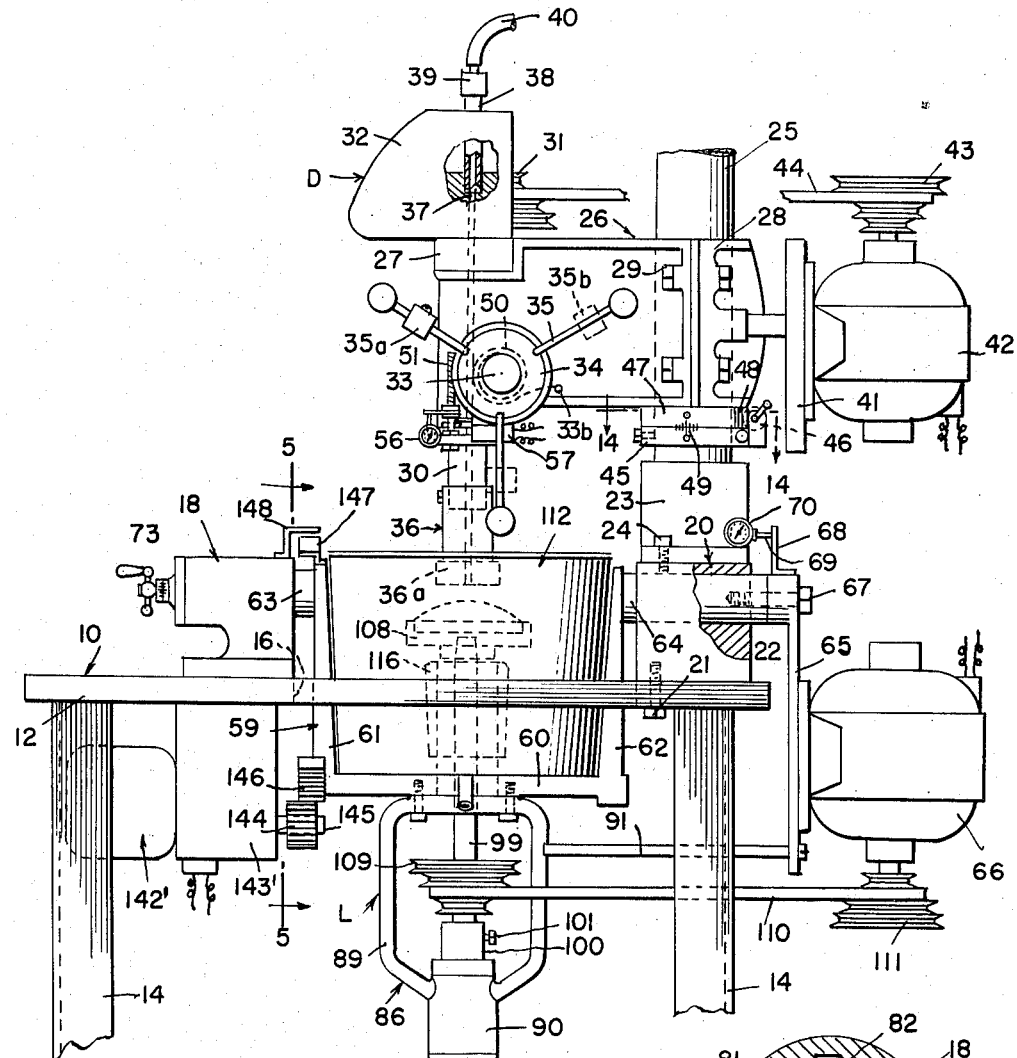
Figure 1 is a view in side elevation of a lens grinding machine constructed in accordance with the preferred embodiment of the present invention, with parts of the structure being broken away, the lens spindle being shown in dotted outline with a lens supporting chuck thereon and the diamond spindle being shown with a diamond grinder secured thereto in operative relation with the lens.
Figure 14 is a detail section taken substantially on the line 14—14 of Figure 1.
Figure 15 is a detail section taken substantially on the line 15—15 of Figure 4.

Referring now more particularly to the drawings, it will be seen upon reference to Figure 1, which shows the machine of the present invention in side elevation, that the machine comprises two principal or major assemblies, one of which is generally designated D, representing the diamond spindle assembly, while the other is generally designated L, representing the lens spindle assembly.

The two assemblies above referred to are supported upon a suitable table, which is generally designated 10 and which comprises a top or platform 12 supported by suitable legs 14, two only of which are shown in Figure 1, but it will be, of course, understood that a conventional type of table having the required supporting understructure would be employed, which understructure might comprise four independent legs or any other suitable type of supporting means.

The table or platform 12 is provided in the central portion thereof with an opening 16 in which a part of the hereinafter described lens spindle assembly is located.

At the front and rear sides of the opening 16, the table or support 12 has mounted thereon and fixed thereto the front and rear bearings which are designated 18 and 20, respectively.

The rear bearing 20 is in the form of a conventional bearing block which is bolted or otherwise suitably secured to the table as indicated at 21 and has the bearing opening 22 therethrough, which is aligned with a corresponding bearing opening hereinafter described, in the front bearing unit 18.

The diamond spindle assembly D is supported upon the top of the rear bearing unit or block 20 and comprises a base socket 23 which is flanged at the sides and bolted to the top of the bearing block 20, as indicated at 24.

The socket 23 which constitutes a step bearing has mounted therein the lower end of a vertical post or standard 25, and upon this post or standard 25 there is secured an arm which is generally designated 26 of the form or construction found in a conventional drill press structure in that it comprises a main elongate portion 27 having a rear end formed to partially encircle the post or standard 25 and a cap portion 28 which encircles the rear part of the standard and is bolted to the forward elongate portion by the bolts 29 which, when loosened, permit the entire arm and the parts carried upon the forward end thereof to be raised and lowered on the post.

The forward end of the arm supports for free rotation and also for up and down or axial movement the spindle or arbor 30 which constitutes the diamond spindle of the machine, and the upper end of this spindle carries a cone pulley unit 31 which is partially enclosed in the conventional hood 32, as illustrated, the rear portion of the hood being open to permit a drive belt to enter and encircle the pulley.

The spindle 30 is supported as stated for up and down movement as well as for rotational movement, and such up and down movement is effected through the medium of a shaft 33 which is rotatably supported by the arm 26 and has connected to one end thereof by means of a wheel 34, a number of radial feed arms 35 by means of which the vertical movement of the spindle may be effected manually.

Since the mounting for the spindle and the means for raising and lowering it through the medium of the arms 35 is conventional in drill presses, no detailed illustration of the mechanism by means of which the coupling between the shaft 33 and the spindle 30 is effected is believed to be necessary as this construction is well known.

In addition to the overhead spindle support described, the spindle and the feed arms, the diamond spindle assembly comprises a mechanical and electrical depth stop and water cooling attachment with a variable drive motor for rotating the spindle 30.

For feeding cooling water through the diamond spindle to the diamond grind unit which is secured to the lower end of the spindle and which unit in Figure 1 is generally designated 36, the spindle 30 is provided with a a fluid passage 37 which, of course, passes through the cone pulley 31 and connected with this passage through the top of the cone pulley is a water feed pipe 38 to which is attached by a suitable swivel coupling 39 a tube or pipe 40 by which the cooling water is supplied to the diamond cutter and the surface of the lens upon which the cutter is operating, from a suitable supply source.

Secured to the back end of the diamond spindle support arm 26 is a mounting plate 41 upon which is mounted the electric motor 42 by which the diamond spindle is operated, and the shaft of the motor which is directed upwardly carries a conventional cone pulley 43 which is connected by the drive belt 44 with the pulley 31, as illustrated.

For effecting horizontal translation of the diamond spindle, the post 25 upon which the arm 26 is supported, has secured therearound beneath the rear end of the arm the split collar 45. This split collar supports a worm gear 46, the axis of which is perpendicular to the post 25 and extends across the rear part of the post, as shown.

Between the split collar 45 and the arm, the post is encircled by a ring or collar 47 which carries a gear segment 48 with which the worm 46 meshes and this collar is secured to the forward part of the arm so that upon rotation of the worm gear, rotational movement will be imparted to the arm to turn the same around the post.

The split collar 45 and the gear collar 47 are provided with matching micrometer scales whereby the degree of rotational movement of the arm can be checked, the micrometer scales being designated 49.

The motor 42 for operating the diamond spindle 30 is of the variable drive type and is connected in the electrical circuit hereinafter described.

The diamond grinder or head is designated 36a and forms a part of the unit 36 which is secured to the lower end of the spindle in any suitable manner and, of course, may be raised at any time by the operation of the feed arm or arms 35.

Means is provided for effecting the automatic advancement of the grinder carrying spindle 30 toward the lens being generated, the preferred form of which means is shown particularly in Figures 1, 16 and 17. This automatic feed means preferably comprises a coil or twist spring 50 which encircles the shaft 33 and has one end secured to the shaft in a suitable manner as indicated at 33a and the opposite end secured in any suitable manner, as by means of a screw, pin or the like 33b to a fixed part of the structure adjacent to the shaft. The spring 50 is attached to the shaft 33 so that when the shaft is turned by means of the arms 35 to raise the spindle 30, the spring will be wound up and placed under tension. For cooperation with the spring there is provided a counterweight 35a which is mounted upon an arm 35 and which functions to balance the tendency of the spring when the shaft 33 has been turned in raising the spindle to a position where the weight is on the side of the shaft away from the spindle or in the position indicated in dotted outlines by the reference character 35b. When the shaft is turned for advancing the spindle so that the counterweight is in the position shown in full lines in Figure 1, then the spring will take control and feed the spindle down, moving the weight from the full line position shown downwardly.

The spindle 30 carries a conventional mechanical depth stop which comprises a vertically disposed threaded stud 51. This stud is attached at its lower end to the spindle in the conventional manner and carries the adjustable nut 52 which engages stop fingers 53 carried by the adjacent portion of the arm 26 to limit the downward movement of the spindle.

The nut 52 has swivelly connected therewith the outwardly extending depth dial actuator finger 54 which is positioned to bear against the upwardly directed end of the operating stem 55 of a depth indicating dial 56 which is mounted upon the arm 26.

There is also secured to the arm adjacent to the threaded stud 51 a microswitch 57 forming a part of the electrical operating circuit and which microswitch embodies the blade 58 which has its end located in the path of travel of the nut 52 so that when the spindle has moved downwardly to the desired extent which will be indicated upon the depth dial indicator 56 through the engagement of the finger 54 with the stem 55, the nut 52 will engage the microswitch blade 58 to close the microswitch, the latter being normally open.

The lens spindle assembly comprises in addition to the bearing units 18 and 20, a bracket cradle which is generally designated 59 and which, as shown, is of generally U-shape, having the horizontal bottom part or plate 60 and the spaced vertical front and rear arms 61 and 62 respectively. The overall width of the cradle 59 is materially less than the width of the table opening from front to rear, whereby the cradle can be disposed in this opening, as shown in Figure 1.

The front and rear arms 61 and 62 carry, respectively, the trunnions 63 and 64. The rear trunnion 64 extends through and is supported in the bore 22 of the bearing block 20 and has secured to its rear end the depending lens spindle motor mounting plate 65, to which is secured the variable speed lens spindle motor 66.

The plate 65 is shown attached to the rear end of the trunnion 64 by a bolt 67, but obviously any other suitable means may be provided for effecting this attachment.

The top end of the plate 65 carries an upstanding plate or finger 68 which is designed to engage the rearwardly directed end of the stem 69 of an indicator 70 to indicate the extent or degree of front-to-rear movement or axial movement of the trunnions 63 and 64 and the lens spindle mechanism supported thereby, in the manner hereinafter described.

The bearing unit 18 has the bore or bearing sleeve 71 therein which receives the forward trunnion 63 and the forward end of the unit is formed with a chamber 72 into which the end of the trunnion 63 extends, and the front end of this chamber is closed by the removable plate 73 through which extends an adjustment screw 74 which passes axially into and through the chamber 72 and into a receiving bore 75 in the trunnion 63, in which bore the screw 74 rotates freely.

The screw 74 is also supported by the plate 73 for free rotation, but is held against axial movement, and upon its outer end, it carries the micrometer dial 76, the scale of which cooperates with the corresponding scale upon a collar 77 which encircles the screw 74 but is fixed only to the cover plate 73 so that the screw 74 can turn freely therein while the dial 76 turns with the screw.

The end of the trunnion 63 has a recess 78 in which is positioned the cylindrical nut 79 which is maintained in place by the cap 80. The screw 74 passes through and is in threaded connection with the nut 79, and the nut 79 is held against rotary movement by the pin 81 which has one end secured in the nut while the other end engages in a guide groove 82 in the wall of the chamber 72, as shown in Figure 4. Accordingly, it will be seen that upon rotating the screw 74 by means of the crank 74a, thrust will be applied to the nut 79 and front-to-rear movement can thus be effected for the bracket cradle and the other parts connected therewith. The front-to-rear movement or positioning of the entire lens spindle assembly is thus accomplished by rotating the shaft or screw 74, which movement will be indicated by the dial indicator 70 and the fine or micrometer scales carried by the dial 76 and collar 77.

The chamber 72 also houses a thrust spring 83 which bears at one end against the chamber cover plate 73, and at its other end, applies constant thrust to the trunnion 63 through the cap 80. Thus, the lens spindle assembly is constantly urged rearwardly but is held against such movement by the engagement of the screw 74 in the nut 79. This assures a steadiness and any tendency of the assembly to move by reason of looseness in the thread connection between the screw 74 and nut 79 is prevented.

The plate 60 of the bracket cradle has a central opening 84 therethrough and secured to the underside of the plate 60 by bolts or in any other suitable manner, as indicated at 85, is the depending elongate bearing hanger frame which is generally indicated by the reference character 86. This frame comprises a top or head portion 87 from which extends upwardly the tubular bearing cylinder 88, and the spaced parallel downwardly extending side bars 89 which at their lower ends join opposite sides of and support the elongate vertically disposed cylindrical bearing guide tube 90 which is in axial alignment with the bearing cylinder 88.

The side bar 89 nearest to the motor support plate 65 is connected with the support plate by a brace bar 91.

The bearing guide tube 90 has fitted therein a circumferentially grooved bearing sleeve 92. The groove which is formed around the outer side of the bearing sleeve is designated 93 and has compressed therein the felt oil packing 94. The bottom end of this bearing sleeve 92 has secured thereto a follower plate 95 which carries a follower pin 96 slidably engaged in the guide groove 97 formed in the wall surface of the tube, as shown.

The plate 95 carries the nut 98 which projects above the plate in the circular upper portion 98a, and this circular projecting portion 98a of the nut 98 enters the lower end of the tubular lens spindle 99 which is rotatable within the bearing sleeve and around the circular portion of the nut, as will be readily apparent.

Above the bearing sleeve 92, the spindle 99 has secured thereto the locking collar 100 which extends into the upper end of the tube, as shown, and interposed between the lower end of this locking collar, which is adjustably secured in position by a set screw 101 or by any other suitable means, and the top end of the bearing sleeve 92, is a thrust bearing which is generally designated 102.

The spindle 99 has a passage 103 extending through the length thereof providing a means, as hereinafter set forth, of securing to the top end of the spindle by suction, a lens supporting chuck.

As shown, the spindle 99 extends upwardly through the upper bearing cylinder 88, and in the upper part of this cylinder is fixed a bearing sleeve 104 which is circumferentially channeled, as indicated at 105, to receive packing material 106 which engages the inner surface of the bearing cylinder, as illustrated, thus functioning not only to prevent the passage of any foreign matter downwardly through the cylinder, but also providing by the sleeve 104 a centering bearing for the upper end of the spindle which projects a substantial distance above the top end of the cylinder, as illustrated.

The top end of the spindle 99 is tapered, as indicated at 107, to receive a lens supporting chuck, one such chuck being shown in section in Figure 2 and designated 108 and which particular chuck is designed to be held in place on the spindle by suction, as hereinafter described.

Within the frame 86 and above the locking collar 100, the spindle 99 has secured thereon the cone pulley 109 which is connected by the drive belt 110 with the cone pulley which is secured to the lower end of the shaft of the motor 66 and designated 111.

The bracket cradle 59 supports upon the bottom plate and between the arms 61 and 62 the grinding pan, which is generally designated 112, and which comprises a circular open top receptacle having the side wall 113 and the bottom 114. The over-all diameter of this pan is approximately equal to the width of the space between the upper ends of the arms 61 and 62 and the height of the pan is such that it projects slightly above the upper ends of the arms, as illustrated.

The bottom 114 has a central opening defined by an upstanding circular sleeve 115 which encircles and snugly engages the wall of the cylindrical extension 88 of the head portion of the bearing hanger frame.

This pan 112 performs the usual function of conventional grinding pans used in connection with lens grinding machines, of receiving the water which is discharged onto the surface of the optical lens as it is being ground, and the ground off material of the lens.

In order to prevent any of the water or ground off material from entering the bearings around the spindle 99, there is provided the downwardly opening cup-like splash cover, which is designated 116, and which comprises the head portion 117 and the encircling downwardly extending skirt 118.

This splash cover not only functions to prevent water from reaching the upper part of the spindle and the upper part of the cylinder 88 in which is positioned the packing 106, since the skirt portion 118 extends down around the outer side of the sleeve 115, as shown, but it also provides a means of forcing from the tapered end 107 of the spindle the lens supporting chuck. This latter operation or function is obtained by providing the head 117 with the threaded opening 119 for engagement with the threaded portion 120 of the upper end of the spindle just below the tapered part 107. Thus, it will be apparent that when the cover is threaded up or off the spindle, it will push against the chuck and lift it from the tapered end of the spindle.

In addition to the splash cover 116, there is also provided a dam 121 which is adapted to be stretched across the open top of the pan 112 and which has therein a central opening through which the grinding spindle 30 may extend to position the grinding head below the dam and within the grinding pan. This dam is preferably formed of relatively thin rubber sheeting of proper size to cover the open top of the pan and with edge portions formed to grip the side of the pan, and the opening 122 is of a size which requires that it be stretched slightly to go around or have the grinding spindle and grinder passed therethrough so that it will fit closely or tightly around the spindle and thus prevent water from splashing out of the pan.

In addition to the use of a conventional type of chuck upon the lens spindle 99 where the chuck would be held on the spindle by frictional engagement or where in addition the lens would be secured to the chuck in the conventional manner by the use of pitch or other adhesive, it is contemplated to use a chuck such as that previously referred to as the suction secured chuck 108 or a magnetic chuck, such as that shown in transverse section in Figure 9 and generally designated 123.

The vacuum or suction held chuck 108 comprises a body 124 of suitable size and thickness having in the central part thereof the axially extending tapered socket 125 which communicates at its upper end with the more sharply tapered or constricted valve seat forming wall portion 126. This valve seat forming portion 126 opens through the top of the body 124 into and through the bottom or floor 126' of a recess 127. The outer part of this recess is defined by the upstanding flange 128 and lining the inner side of the flange and the adjacent part of the bottom 126' is a gasket 129 on which is seated the optical lens to be ground.

Spanning the upper part of the tapered bore 125 is a centrally apertured plate 130 on which is supported the lower end of an expansion coil spring 131. This spring bears against the underside of a tapered valve disk 132, the tapered periphery of which seats against the surrounding constricted wall surface or seat 126 and against which is is held normally by the spring. This valve, in the upper end of the chuck socket, closes with sufficient tightness to prevent water from passing downwardly into the passage or bore 103 of the spindle 99, but it does not have a ground fit, or in other words, it does not fit with a tightness which would prevent some slight leakage of air after completion of a grinding operation upon a lens which had been secured by suction, thereby assuring easy removal of the mounted lens after the suction has been discontinued.

Axial adjustment of the spindle shaft 49 is effected by the screw 133 is threaded into and through the nut 98, and this screw is also provided with an axial bore or passage 134 which communicates with the passage 103 of the spindle for effecting the desired reduction of air pressure in the spindle passage beneath a lens mounted in the chuck, for the purpose of holding the lens in position.

The lower end of the bearing guide tube 90 is closed by the cap 135 which is secured to the guide tube in a suitable manner, as by means of the cap screws 136. This cap has threadably secured in the central part thereof, a guide sleeve 137 through which the lower end of the screw 133 passes and into which it is swivelly mounted in any desired manner which will permit its free rotation but prevent it from moving axially. The lower end of this screw extends beyond the outer side of the cap 135 and carries a micrometer dial in the form of a wheel or collar 138 and a crank 139 by means of which rotation of the screw can be effected.

Also encircling the lower end of the screw 133 and positioned between the dial 138 and the cap 135 and secured to the cap against rotation is a corresponding micrometer scale varying member 140. This member and the dial 138 carry micrometer scale markings, and it will be apparent that upon rotation of the crank 39, the spindle and parts secured thereto will be moved axially for raising and lowering the lens being ground with respect to the grinding tool, and the amount of axial movement of the spindle will be shown by the micrometer scales.

Below the crank 139, a swivel pipe coupling or union 141 is connected with the lower end of the tubular screw 133, providing a coupling nipple 142 with which is connected an end of an air or vacuum hose 143 which is connected with a suitable vacuum pump.

The inclination of the lens spindle or angular traverse of the lens by the oscillation of the cradle 59 on the trunnions 63 and 64 is effected by the angular traverse electric motor 142' operating through a gear reduction mcechanism 143' to rotate the pinion gear 144 which is carried by the shaft 145. This pinion gear 144 meshes with an arcuate rack gear 146 secured to the cradle at the bottom of one of the arms thereof, here shown as the arm 61. The arc of the rack gear 146 is struck from the center of the trunnion 63, the rack gear being disposed at an elevation below the platform or table top 12 and the traverse motor 142' and reduction gearing 143' is also supported upon the underside of the table, as illustrated in Figure 1. As will be readily apparent, the rotation of the pinion gear 144 will effect the turning or swinging of the cradle 59 and the lens spindle and other parts supported thereby on the axis of the trunnions 63 and 64 and in order to gauge the extent of swing, there is provided an arcuate scale plate 147 mounted upon the upper end of the arm 61 which, of course, is the arm nearest the front of the machine where the operator can watch the indicator and associated with this scale plate is a stationary pointer finger 148 which is mounted upon the adjacent bearing 18 and extends over the scale plate, as illustrated.

The magnetic chuck 123 shown in Figure 9 comprises a metal block body 149 in the underside of which is formed a tapered socket 150 to receive the tapered upper end of the lens spindle 99. The top of the block 149 has formed therein a recess 151 defined by a low upstanding flange 152, and at one point, the flange has an opening 153 therein, the bottom of which slopes outwardly and downwardly from the bottom of the recess, which is provided to facilitate the removal from the block of an adapter of metal, designated 154 and shown in dotted outline, to which is secured by pitch, the lens body which is also shown in dotted outline and designated 155.

The body 149 has set therein a number of permanent magnets, two only of which are here illustrated and designated 156. These magnets are suitably insulated from the block 149, as indicated at 157, and the magnets are exposed through the bottom of the recess 151 so as to exert the desired magnetic attraction upon the adapter 154. When this magnetic chuck is employed then, obviously, the vacuum system working through the hollow or tubular spindle 99 is not in operation.

It will be, of course, obvious that a chuck of the type shown in Figure 9 is only suitable for use in the lens or plastic industry or some industry using nonmetallic or nonmagnetic materials, since any magnetic materials being ground would stick to the chuck.

The electrical system for controlling the several elements of the machine is illustrated in two parts in Figures 6 and 7, and embodies controls for the lens spindle motor, the diamond spindle motor, a water pump operating motor for pumping water to the diamond spindle by way of the tube 40, a vacuum pump operating motor for actuating a suitable vacuum pump by which a vacuum may be applied to the vacuum chuck by way of the tube 143 and tubular spindle, and the traversing motor. The wiring system for the machine is such that almost any combination of the motors can be selected for operation or can be turned on or off with one switch and any part of the machine may be selectively controlled manually at any time.

Through the medium of the limit switch 57, automatic shut off of the motors is effected when a preset lens thickness has been reached.

Referring now to the circuit diagram of Figure 6, the numeral 158 designates the conductors connecting the system with the power source, and the numeral 159 designates a relay which controls the availability of power to the manual on-off switches 160, 161 and 162 associated, respectively, with the lens spindle motor 66, the diamond spindle motor 42 and the water pump operating motor which in the diagram is designated 163.

The numerals 164 and 165 designate push-button switches of the on-off automatic type and these control the relay 159 which is a single pole double-throw type relay.

The depth stop switch 57 which is operated by the diamond spindle is a normally open single pole single-throw microswitch.

The numeral 166 generally designates a motor for operating a vacuum pump and is manually controllable by the on-off switch 167. A solenoid valve 168 is included in the electric circuit for the vacuum pump and motor 166. This valve opens the vacuum line to vent when the motor is stopped, the vent being indicated at 169 and the suction line which is connected with the lens spindle being indicated at 170.

As hereinbefore stated, the inclination from the vertical of the lens spindle is effected through the operation of the traverse motor 142' which functions to swing the cradle 59 on its trunnions and the circuit for effecting the operation of the motor together with the double pole double-throw control switch by which the driving of the motor in the desired direction is illustrated in Figure 7.

Also in Figure 7 are shown limit switches 171 which are located upon opposite sides of the cradle 59 in the proper positions where the swinging of the cradle beyond a desired extent will effect the actuation of one or the other of the switches to open the motor circuit and stop the operation of the traverse motor.

The numeral 172 designates actuating fingers for the limit switches 171 which are located to be engaged by some part of the cradle as, for example, the ends of the arcuate rack 146 when the cradle and grinding pan have been swung in one direction or the other to the desired limit.

This swinging of the cradle, which is effected by the energization of the traverse motor 142' is entirely manually controlled or effected. In the circuit diagram shown in Figure 7, the numeral 173 designates the conductors leading from the power source, and the numeral 174 designate a push-button switch by means of which the circuit having the limit switches 171 and the motor 142' therein is energized for the desired length of time.

To effect the desired direction of swing of the cradle 59, there is provided the double pole double-throw switch 175 which, as will be readily obvious from the circuit diagram, when in one position will deliver current through one limit switch to the motor 142' to drive the motor in one direction and when the switch is thrown to the other position, the current will be delivered to the traverse motor through the other limit switch 171 to effect the swinging of the cradle in the opposite direction. As previously stated, this supply of current to the motor 142' is controlled by the push-button switch 174, and it will be readily apparent that if the operator keeps the circuit closed longer than he should so that the cradle 59 swings farther than desired, one or the other of the limit switches 171 will be actuated to open the circuit to the motor, stopping the same and thereby preventing damage being done to the machine.

As previously stated, the grinding pan encloses beneath the covering dam 121 a lens mounted on the spindle 99 and the grinding head mounted upon the diamond spindle 30, and cooling water is supplied to the grinding head and the surface of the lens through the passage 37 of the diamond spindle.

In order to drain the water and ground material from the grinding pan 112, outlets 112a are provided in the bottom 114, preferably at the sides of the pan which are lowered when the pan is swung from one position to the other so that complete drainage can be effected.

In the operation of the machine, the relay 159 is controlled by the automatic "on-off" push-buttons 164 and 165, and the microswitch 157. If the push-buttons associated with the diamond spindle, the lens spindle and the cooling water motor are left in the on position, all of the motors will go on and off with the operation of the relay 159 by the automatic push-buttons. Also, if the relay 159 is closed and the limit switch 57 is operated and closed by the depth stop 52, the relay will operate to shut off the three motors 42, 66 and 163. However, the vacuum motor 166 will continue to operate, as will be readily apparent upon examination of the circuit diagram in Figure 6, and the lens will be held in position on the spindle by the vacuum chuck. It will also be readily apparent upon examination of the circuit diagram that any of the motors may be turned off or on independently of the others.

Manual control of the machine is available at all time. Adjustment of the depth microswitch in such a manner as to prevent the depth stop from actuating the relay 159 will, of course, prevent automatic shut-off of the machine. To operate the machine manually under such conditions, the automatic "on" button is left in the "on" position, and the operation of the motors is then controlled each by its own individual control switch. Pilot lights associated with the control buttons, as shown in the diagram, indicate when the motors are on or off.

In connection with the vacuum motor control 166, this is connected in circuit in such a way as not to be affected by the automatic controls above stated. The reason for this is that a lens, when mounted on the vacuum chuck, must be chucked firmly on the lens spindle before the latter is started. It is also necessary from time to time to inspect the grinding operation by stopping the system, and when this is done, obviously, the lens should not be released unless such action is desirable.

The solenoid valve 169 included in the vacuum pump circuit opens the vacuum line to vent the line when the motor is stopped. This releases the vacuum in the vacuum line and releases the lens. Upon the starting of the motor 166, the relay is energized to close the vent port so that the desired vacuum is applied through the lens spindle to the lens chuck.

It will be readily apparent from the illustration and description of the machine that in addition to the axial adjustment or movement of the grinding spindle and the lens spindle, three positions of adjustment are possible whereby, by the employment of grinding heads of selected sizes upon the diamond spindle, any type of lens may be ground, whether it be a concave lens, a convex lens or a flat lens surface, and the size of the lens may vary from the smallest possible size to the maximum size which the grinding pan will accommodate. Obviously, also, the machine may be made in different sizes so that the grinding pan may be of different sizes according to the build of the machine.

By adjusting the angle of inclination of the lens spindle and the selection of the proper diameter of diamond grinding head, the curvature of the lens is determined. This adjustment of the angle of the lens spindle is effected through the operation of the traverse motor 142', as previously stated. This motor when operating will swing the diamond spindle on the axis of the trunnions 63 and 64. This traversing or angle change of the diamond spindle may be accomplished with the machine in operation, and it will be readily apparent that by merely operating the push-button 174, the machine can be made to grind from a plus to a plano and to a minus curvature.

Operation of the crank 139 effects the vertical adjustment of the lens spindle and the vertical positioning of the spindle to the desired degree of accuracy is determined by the positioning micrometer embodied in the relatively rotatable parts 138, 140. This vertical positioning is necessary to accommodate lenses of various thicknesses, and in the operation of this machine, it is important that the grinding surface of the lens should always be on or very close to the axis of rotation of the traversing unit, or in other words, the axis of swing of the cradle which supports the lens spindle.

The front-to-rear positioning of the lens spindle is effected by the operation of the crank 74a which shifts the cradle and the lens spindle in the direction of the axis of the trunnions 63 and 64, and accurate control of this adjustment is had by the relatively rotatable micrometer parts 76 and 77. With a large change in diamond size and respective change in the offset of the diamond head, the diamond and lens spindles will no longer have their axes in line, and the front-to-rear positioning of the lens spindle provides for the necessary compensation under such circumstances, when required.

Cross-axis adjustment of the diamond spindle with respect to the lens spindle is effected by actuation of the worm and gear segment, parts 46 and 48. This adjustment becomes necessary when the diamond diameters are changed and is an adjustment which may be made while the machine is in operation. Also, it will be readily apparent that the entire diamond spindle assembly may be moved or adjusted vertically on the support standard 25 whenever it may be necessary by loosening the bolts 29, but such adjustment is seldom necessary.

As hereinbefore stated, the herein disclosed machine is capable of grinding compound lenses of the character described in the William Phillips Patent No. 2,703,649, one of which lenses is here illustrated in Figure 13, while Figures 10, 11 and 12 illustrate the manner in which a number of such lenses or lens blanks are assembled in a chuck to be ground simultaneously, and these figures also illustrate the employment of grinding heads of different diameters for generating the two fields of each lens on different radii. The lens here illustrated and generally designated 176 is a one-piece multifocal, monocentric opthalmic lens having the distance and reading fields 177 and 178, respectively, the radii of which fields are different.

In the William Phillips patent above referred to, six of the lens blanks are set up on the chuck carried by the ens spindle, to be ground at one time. At the start of the grinding operation, the lenses are secured in a cup, such as that indicated at 179, at a predetermined inclination to have the distance fields ground by a grinder 180, the cup 179 being secured to the chuck 181 which may be in the form of the vacuum chuck hereinbefore described for maintenance upon the lens spindle 99.

Figure 11 illustrates the use of a grinder of smaller diameter and the use of another type of lens supporting cup, in which the blanks are disposed on a different arc, the grinder being designated 182 and the supporting cup for the lens blanks being designated 183. In this set-up, the smaller grinder 182 grinds or generates the reading field 178.

As set forth in the patent above referred to, a third grinding operation is performed, forming the lateral or side intermediate fields 184 and in this operation, the lens blanks are maintained in the cup 183 at the same inclination as in the grinding of the reading field 178, but a larger size of grinder is employed, which larger grinder is designated 185.

The manner in which the lens blanks are set up in the cups 179 and 183 is fully set forth in the issued patent hereinbefore referred to. However, in that patent it will be seen that three separate and individual spindles are employed for the three different grinding operations, each spindle being set up to a different angle and each spindle is fixed in position and is set for the grinding of one curvature on the group of lenses. It is possible to make adjustments for different angles, but this involves some difficulties whereas such adjustments can be easily and quickly made in the present machine, and all three of the grinding operations to produce the fields 177, 178 and 184 can in the present machine be accomplished with the single lens supporting spindle.

With the present machine, the angle of the present traversing mechanism can be easily changed while the machine is in operation to set the lens spindle at any desired angle, and it will also be seen that the depth of cut between the different operations can be closely controlled and accurately determinated. However, in making the ophthalmic lenses described, the diameters of the diamonds must be changed, and the same general procedure for making the ophthalmic lenses as set forth in the patent referred to would be used.

In a machine constructed in accordance with the present invention, small radius curves, plus or minus, may be made down to any point that is humanly possible. With lenses up to 8" in diameter, plus or minus, an arc length of 120° may be obtained. Beyond an 8" diameter lens, the maximum arc length, plus or minus, will decrease to 90° at 12½" diameter. The minimum radius of curvature, plus or minus, that can be made on a 12½" diameter lens is 9". Construction of the machine on a larger scale to receive within the grinding pan 112 a lens of greater diameter would, of course, permit a corresponding change in the minimum radius which it would be possible to obtain.

For lenses of less than 8" diameter, the minimum radius of curvature plus or minus that can be made with 120° of arc is .575 times the diameter. The minimum radius of curvature for plus or minus lenses between 8" and 12½" will lie between 4.6" and 9", respectively. The limitation on length of arc and minimum radius plus or minus is the angle of traverse. For the design of machine adapted to handle lenses of the maximum diameter here stated, the limitation on length of arc and minimum radius plus or minus is the angle of traverse specified as plus or minus 30°.

The minimum radius curve in all cases is infinity or plano.

On a machine of the character here disclosed, the lens may be made as small in diameter as it is possible to make a means for holding it, whereas as previously stated, the maximum diameter of the lens is determined only by the physical size of the machine, the measurements above set forth having a maximum limitation of 12½" lens diameter.

For a lens of 12½" diameter, the maximum diameter required for the diamond grinding unit or head is 6¾". The minimum radius for any diameter lens is only possible with a diamond having one-half the diameter of the lens. If a larger diamond is employed, the minimum curvature cannot be obtained.

From the foregoing, it is believed that the operation of the present machine will be readily apparent and that by the novel manner of mounting the diamond spindle and the lens spindle whereby the lens spindle can be swung about an axis passing close to the surface of the lens being ground and back and forth adjustments of the diamond spindle and the lens may be made on said axis together with the vertical adjustment and horizontal swing of the diamond spindle, lenses of any positive or negative curvature can be made or compound lenses can be ground as hereinbefore described. Also, as previously stated, the depth of grind can be accurately determined and automatic shut off of the machine for stopping of the grinding operation may be effected when the desired degree or depth of grind has been attained.

I claim:

1. In an optical lens grinding machine, a unit suspended for turning on a horizontal axis, a lens spindle rotatably supported on said unit for turning on an axis intersecting and perpendicular to the turning axis of the unit, said spindle having one end adapted to receive a lens chuck and located to support a chucked lens with the center of the surface of the lens in close proximity to the axis line of the unit, means for effecting rectilinear movement of said unit parallel to said axis line, a grinder spindle, means supporting said grinder spindle for rotation on an axis perpendicular to the turning axis of the unit and for traverse in a horizontal path across the unit turning axis, said supporting means for the lens spindle and said supporting means for the grinder spindle being so relatively movable as to enable the spindles to be positioned in axial alignment, means for effecting axial rectilinear movement of said grinder spindle, and means for rotating said spindles.

2. The invention according to claim 1, with means for effecting the turning of said unit on said horizontal axis in either of two directions from an initial starting position, and movement limiting means actuated by the turning unit to stop the latter after a predetermined extent of such movement.

3. The invention according to claim 1, with mechanical means for advancing the grinder spindle against a lens on the chuck as grinding proceeds, and means moving with and actuated by the grinder spindle for stopping advancement of the grinder spindle when a predetermined depth of grind has been attained.

4. In an optical lens grinding machine, mechanism for generating lenses ranging in form from a convex to concave curvature, said mechanism comprising a substantially U-shaped cradle unit including two aligned trunnions, mounting means for the trunnions for suspending said unit and permitting the swinging of the unit on the axis of the trunnions, a grinding pan in and supported by the cradle, a lens spindle supported by the unit perpendicular to the axis of the trunnions and having a chuck supporting end terminating within the pan in close proximity to the axis line of the trunnions, means connected with the spindle for rotating the same, said trunnions being slidable axially in said mounting means, means for effecting rectilinear movement of the unit axially of the trunnions, a rotatable grinder spindle, means supporting the grinder spindle in perpendicular relation to said axis line of the trunnions, said grinder spindle supporting means further being constructed to facilitate moving the grinder spindle horizontally across said axis line, the spindles being adapted through their respective supporting means to be brought into axial alignment, means for rotating the grinder spindle, and means for effecting the swinging of said unit with the pan and lens spindle on the axis of the trunnions.

5. The invention according to claim 4, wherein the lens spindle is supported by the U-shaped cradle by a hanger secured to the lower part of and suspended from the cradle, and said lens spindle rotating means including a driving motor and a motor mounting bracket secured to one trunnion whereby the motor and unit swing together.

6. The invention according to claim 4, with means for effecting axial movement of the lens spindle while the latter is rotating and means for effecting axial movement of the grinder spindle.

7. A lens grinding machine for generating convex, plano or concave lenses, said machine comprising a rotatably supported grinder spindle, means for axially moving said spindle, means for moving the spindle in a plane perpendicular to its axis, said spindle being adapted to support a grinder upon one end, a lens spindle adapted to have a lens chuck secured on one end thereof, a lens spindle support mounted for rocking movement on an axis perpendicular to said grinder spindle axis and reciprocable on its rocking axis, said lens spindle being rotatably mounted on said support with the said chuck carrying end thereof in relatively close proximity to the grinder carrying end of the grinder spindle and to said axis, power delivering means carried by the support and rockable therewith for imparting rotation to the lens spindle, means for imparting controlled rocking movement to the support while the spindle is rotating, means for reciprocating the support in a line paralleling the rocking axis thereof, the means supporting the spindles being constructed and arranged whereby the spindles may be brought into axial alignment, and means for imparting rotation to the spindles.

8. The invention according to claim 7, with means for maintaining a constant advance of the grinder spindle toward a lens carrying chuck on the lens spindle, the said means for rotating the lens spindle and the grinder spindle comprising independent electric motors, and electrical control means which becomes operative for stopping said motors upon a predetermined amount of advancement of the grinder spindle.

9. The invention according to claim 7, wherein the said means for rocking the support comprises an arcuate gear rack concentric with the turning axis of the support, an electric motor driven gear meshed with said rack, manually operated electric circuit closing means for operating said motor and limit switches at opposite ends of the arc of swing of the support for opening the motor circuit while the manual means is closed when the support reaches a predetermined extent of swing in either direction.

10. A lens grinding machine, comprising a pair of spaced bearings, a substantially U-shaped cradle unit between the bearings and including aligned trunnions extending from opposite sides of the cradle and supported in the bearings for both turning movement and axial rectilinear movement, a frame suspended from the bottom part of the cradle unit, a vertical bearing carried by said frame, a lens spindle mounted in the vertical bearing and extending upwardly into the cradle unit and terminating approximately at the axis line of the trunnions, a motor connected with the cradle unit to turn therewith and having driving connnection with the spindle, means for turning the cradle unit on the trunnions, means for imparting rectilinear movement to the cradle unit, a grinding pan in and supported by the cradle unit and having a bottom with an upwardly extending sleeve through which the lens spindle extends into the pan, a support arm disposed above the cradle unit and pan, a grinding spindle rotatably carried by the support arm and having its lower end above the lens spindle in position for cooperation therewith in grinding a lens, means for horizontally moving the grinder spindle across the top end of the lens spindle, means for rotating the grinder spindle, and means for axially moving the grinder spindle toward and away from the lens spindle.

11. The invention according to claim 10, wherein the means for horizontally moving the grinder spindle embodies a vertical standard and a pivot connection between an end of the arm and the standard whereby said horizontal movement of the grinder spindle is along an arcuate path.

12. The invention according to claim 10, wherein the means for axially moving the grinder spindle away from the lens spindle is manually actuated and the means for moving the grinder spindle toward the lens spindle is a spring means which is tensioned by said axial movement of the grinder spindle.

13. The invention according to claim 10, wherein said means for turning the cradle unit on the trunnions comprises an arcuate toothed rack secured to the cradle unit concentric with the trunnions, a reversible electric motor, a pinion driven by the motor and in toothed engagement with the rack, manual means for controlling flow of electric current to the motor for selectively driving the motor, and limit switches in circuit with the motor for stopping operation of the motor upon the swinging of the cradle unit in either direction beyond a predetermined degree.

14. A lens grinding machine comprising a support table having an opening therein, a front and a rear bearing block thereon on opposite sides of the opening and in alignment across the opening, a post rising from the rear block, a substantially U-shaped cradle having a bottom and spaced upright front and rear arms, front and rear trunnions carried respectively from said front and rear arms and respectively mounted in said front and rear bearing blocks and suspending the cradle in said opening for swinging on the axis of the trunnions, said trunnions further being axially shiftable for front to rear movement of the cradle, said cradle bottom having a central spindle opening, a bearing supporting frame suspended from the cradle bottom, a bearing carried by the frame in alignment with the spindle opening, a lens spindle rotatably supported in the bearing and extending through the spindle opening and having a lens chuck supporting end terminating adjacent to the axis line of the trunnions, means for effecting axial movement of the bearing and spindle, means for rotating the spindle, means for effecting swinging of the cradle on the trunnions, means for effecting rectilinear movement of the cradle on the axis of the trunnions, a grinding pan supported on the cradle bottom in surrounding relation with the said chuck supporting end of the spindle, an arm carried by said post above said pan and over said end of the lens spindle, a vertical grinder spindle supported by the arm for rotational and axial movement, the spindles being constructed and arranged to be brought into axial alignment, the grinder spindle being designed to support a grinder on the lower end thereof, means for swinging said grinder spindle arm on the axis of said post, means for effecting rotation of the grinder spindle, and means for effecting axial movement of the grinder spindle.

15. The invention according to claim 14, wherein the means for effecting rectilinear movement of the cradle comprises a screw supported by the front bearing block and having an end portion extending axially into the adjacent front trunnion, means connecting the screw with the front trunnion, and crank means coupled with the screw for facilitating turning of the screw.

16. The invention according to claim 15, with relatively rotatable vernier scales carried by the screw and a stationary part of the front bearing block for gauging the extent of axial movement of the cradle.

17. The invention according to claim 14, wherein said bearing supporting frame is of elongate form and is secured at one end to the cradle bottom, said one end of the frame carrying a bearing cylinder extending upwardly through the spindle opening, a bearing in said cylinder and encircling the adjacent end portion of the lens spindle, said grinding pan including a rigid upstanding, central bottom sleeve tightly encasing the bearing cylinder, and a splash cover having a head encircling and supported on the top end of the lens spindle and a skirt depending from said head and encircling the top portion of said cylinder and sleeve.

18. The invention according to claim 17, wherein the splash cover head is threaded onto the lens spindle and the lens spindle is tapered for frictional retention in a lens chuck socket, said splash cover head being adapted when turned for unthreading from the lens spindle to engage and break the frictional retention of the chuck on the spindle.

19. In a lens grinding machine a rotatable lens spindle having a tapered end, said lens spindle having an air passage axially therein and opening through said end, means for coupling an evacuating means with said passage at said end of the spindle, a lens supporting chuck body having a top adapted to support a lens to be ground, the chuck body having a tapered socket in the under part formed to receive the tapered end of the lens spindle and connecting with said passage, the socket communicating with an opening in the top of the chuck body, and a spring pressed valve normally closing said opening, the evacuation of air from beneath the valve effecting the opening of the valve and the holding of a lens on the chuck.

20. In an optical lens grinding machine, the new combination which comprises, a grinder spindle, a vertical support, a guide structure attached to said support and rotatably carrying the grinder spindle, an annular grinder carried on an end of said spindle, a lense spindle, a rockable support, bearing means carried by the rockable support and having the lens spindle rotatably mounted therein, means on one end of the lens spindle for mounting a lens body thereon, said spindles having a working relation in which the grinder is in closely spaced opposed relation with the lens mounting means, said guide structure attachment to the first named support being pivotal for swinging movement of the annular grinder in an arcuate path across a lens body on the lens spindle and about a pivot axis paralleling the grinder spindle whereby to position the grinding edge of the annular grinder in contact with the center of the surface of a lens body fixed to said lens mounting means, said rockable support including pivot trunnions and said lens spindle being adjustable axially and adapted to be secured to fix a lens on said lens mounting means in grinding position with the grinder contacting center thereof in the turning axis line of the rockable support trunnions, means for moving the grinder spindle axially, means for rotating the grinder spindle, and means for rotating the lens spindle.

21. The invention according to claim 20, wherein said pivot trunnions are supported for limited axial movement, and means for effecting such axial movement.

22. The invention according to claim 20 with bearing means carrying said trunnions and adapted to have the trunnions axially moved therein, means for effecting said axial movement of the trunnions in the bearings, and the said means for rotating the lens spindle embodying a motor unit, a pulley connected with the motor unit for rotation thereby, a pulley carried by the drive spindle, a belt connection between said pulleys, and a mounting plate secured to one of the trunnions and having said motor mounted thereon whereby the latter moves with the trunnions in the axial and rotational movement thereof.

References Cited in the file of this patent

UNITED STATES PATENTS

| | | |
|---|---|---|
| 1,487,024 | Robinson | Mar. 18, 1924 |
| 1,598,766 | Fox | Sept. 7, 1926 |
| 1,741,021 | Hitchcock | Dec. 24, 1929 |
| 2,187,240 | Karasick | Jan. 16, 1940 |
| 2,198,765 | Featherstone et al. | Apr. 30, 1940 |
| 2,278,314 | Houchin | Mar. 31, 1942 |
| 2,291,000 | Simpson | July 28, 1942 |
| 2,392,478 | Holman | Jan. 8, 1946 |
| 2,649,667 | Cooke | Aug. 25, 1953 |
| 2,688,220 | Boutell | Sept. 7, 1954 |
| 2,704,424 | D'Avaucourt | Mar. 22, 1955 |
| 2,747,339 | Schelling | May 29, 1956 |
| 2,806,327 | Coburn | Sept. 17, 1957 |